United States Patent [19]

Sinclair

[11] 4,171,508

[45] Oct. 16, 1979

[54] CIRCUITS FOR HEATING STORAGE BATTERIES

[75] Inventor: Walter Sinclair, Hemel Hempstead, England

[73] Assignee: Lucas Industries Limited, Great Britain

[21] Appl. No.: 858,551

[22] Filed: Dec. 8, 1977

[51] Int. Cl.² .......................... H02J 7/00; H05B 3/60
[52] U.S. Cl. ...................................... 320/2; 219/201; 320/4; 429/120
[58] Field of Search ...................................... 320/2-4, 320/35, 36; 429/120; 219/200, 201

[56] References Cited

U.S. PATENT DOCUMENTS

| | | |
|---|---|---|
| 2,442,380 | 6/1948 | Schrodt et al. |
| 2,899,623 | 8/1959 | Medlar .............................. 320/4 X |
| 2,935,675 | 5/1960 | Ferguson et al. ................... 320/4 X |

FOREIGN PATENT DOCUMENTS 2120417 8/1972 France.
707485 4/1954 United Kingdom.

*Primary Examiner*—Robert J. Hickey
*Attorney, Agent, or Firm*—Kane, Dalsimer, Kane, Sullivan and Kurucz

[57] ABSTRACT

A battery heating circuit comprising a transformer having a primary winding for connection to an a.c. supply and a secondary winding, and at least two pairs of batteries. The two batteries of each pair are connected in series and the series combinations of the pairs of batteries are connected in parallel between d.c. terminals. The secondary winding is connected between the common terminals of each pair of batteries.

3 Claims, 2 Drawing Figures

CIRCUITS FOR HEATING STORAGE BATTERIES

This invention relates to circuits for heating storage batteries to enable charging to be carried out in low temperature conditions. The invention is particularly concerned with circuits for heating several batteries simultaneously.

In accordance with one aspect of the present invention a battery heating circuit comprises a transformer having a primary winding for connection to an a.c. supply and a secondary winding, and at least two pairs of batteries, the two batteries of each pair being connected in series and the series combinations of the pairs of batteries being connected in parallel between d.c. terminals, the secondary winding being connected between the common terminals of each pair of batteries.

Figure 1:
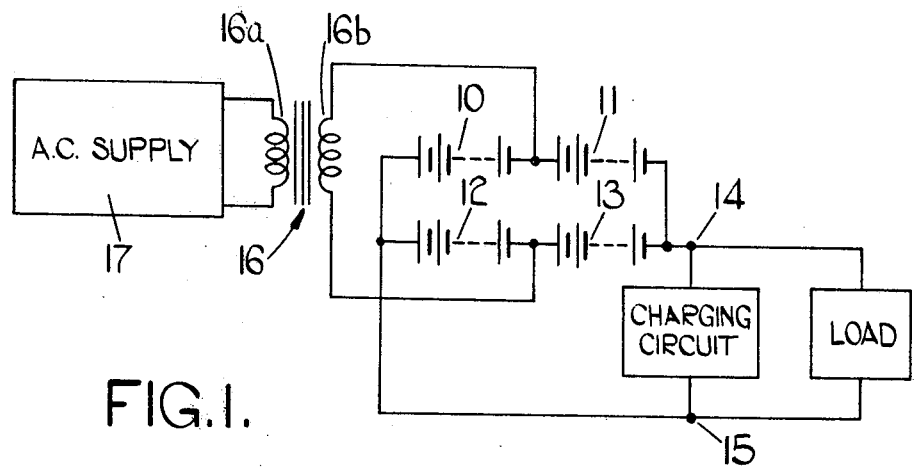
Figure 2:
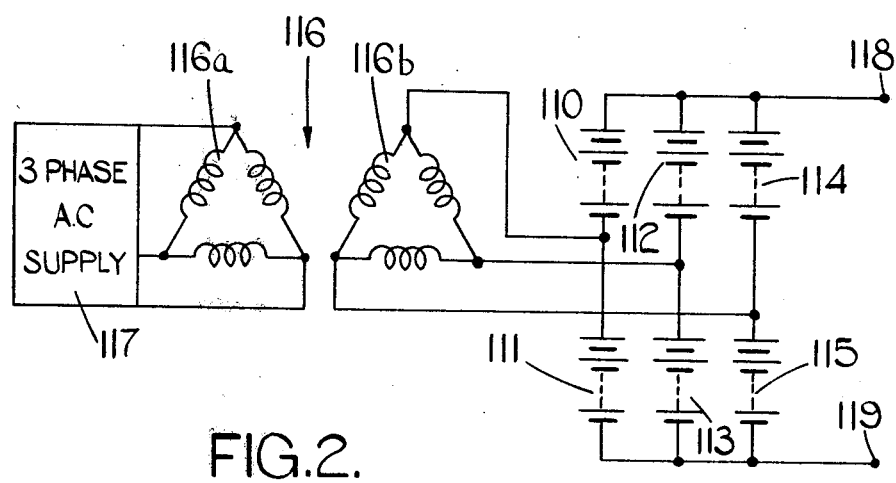

In the accompanying drawings FIGS. 1 and 2 are circuit diagrams of two different examples of the invention.

Referring firstly to FIG. 1 the circuit includes four batteries 10, 11, 12 and 13 these are connected in a series parallel arrangement across the d.c. terminals 14, 15 of the circuit. The batteries 10 and 11 are in series with one another as are the batteries 12, 13.

The heating circuit makes use of a transformer 16 having a single primary 16a and a single secondary 16b. The primary 16a is connected to an a.c. supply 17 and the secondary 16b has one end connected to the interconnection of the batteries 10, 11 and the other end connected to the interconnection of the batteries 12, 13.

With this circuit heating current from the transformer secondary 16b passes through the four batteries, but the direct current drawn from the batteries does not pass through the secondary 16b.

Turning now to FIG. 2 a similar arrangement is shown for heating six batteries 110, 111, 112, 113, 114 and 115 from a phase a.c. supply 117. As in FIG. 1 the batteries are connected in a series parallel arrangement with the batteries connected in series in pairs between the d.c. terminals 118, 119. The transformer 116, in this case, in a 3 phase transformer with each of its primary and secondary windings 116a, 116b delta connected. The three terminals of the secondary winding 116b are connected respectively to the interconnections of the three pairs of batteries.

Once again direct current does not pass through the secondary winding 116b.

Either or both of the primary and secondary windings of the transformer 116 may alternatively be star connected.

I claim:

1. A battery heating circuit comprising a transformer having a primary winding connection to an a.c. supply and a secondary winding having at least two output terminals, at least two pairs of batteries, and a positive and a negative d.c. output terminal, in each pair of batteries the positive pole of one battery being connected directly to the positive d.c. output terminal, the negative pole of said one battery being connected at the common terminal of the pair of batteries to the positive pole of the other battery, and the negative pole of said other battery being connected directly to the negative d.c. output terminal, and the output terminals of the secondary winding being connected to respective common terminals of the pairs of batteries.

2. A circuit as claimed in claim 1 in which the transformer is a single phase transformer and in which there are two pairs of batteries.

3. A circuit as claimed in claim 1 in which the transformer is a polyphase transformer, there being as many pairs of batteries as there are phases of the supply.

* * * * *